United States Patent [19]

Liu

[11] 4,297,322

[45] Oct. 27, 1981

[54] EQUIPMENT FOR TREATING AND RESOURCE RECOVERY FROM SOLID WASTE

[76] Inventor: Hsin Liu, 40-25 Hampton St., Elmhurst, N.Y. 11373

[21] Appl. No.: 129,609

[22] Filed: Mar. 11, 1980

Related U.S. Application Data

[62] Division of Ser. No. 827,693, Aug. 25, 1977, Pat. No. 4,204,906.

[51] Int. Cl.³ .................... B01D 9/00; B01D 11/00; B01F 9/08; B01F 15/02
[52] U.S. Cl. .................................... 422/184; 44/2; 110/221; 110/227; 209/134; 209/136
[58] Field of Search .................. 423/659, DIG. 18; 432/70; 209/11, 134–137; 48/209, 197 A; 162/6, 7, 9, 91, 4; 201/3, 21, 25, 43, 2.5; 44/1 D, 2; 241/1, 3, 4, 19, 23, 28, DIG. 38; 422/184; 110/220, 221, 227, 228

[56] References Cited

U.S. PATENT DOCUMENTS

| 3,814,240 | 6/1974 | Laundrie | 209/11 |
| 3,904,515 | 9/1975 | MacKenzie et al. | 209/138 |
| 3,961,913 | 6/1976 | Brenneman et al. | 44/1 D |
| 4,008,053 | 2/1977 | Brenneman et al. | 44/1 D |
| 4,034,862 | 7/1977 | Bahri et al. | 209/11 |
| 4,164,396 | 8/1979 | Jones | 44/2 |

FOREIGN PATENT DOCUMENTS

| 2441811 | 3/1976 | Fed. Rep. of Germany | 209/11 |
| 2546097 | 4/1977 | Fed. Rep. of Germany | 209/11 |

*Primary Examiner*—Bradley Garris
*Attorney, Agent, or Firm*—Chou H. Li

[57] ABSTRACT

Equipment and method for treating solid waste in which a non-oxidizing atmosphere is provided through which the shredded solid waste falls freely, unsupported and non-contacted, to prevent fusion of the plastics with each other, with other materials in the solid waste, or with the walls or components in the treating equipment. The unique atmosphere also allows a high treatment temperature to accelerate the debonding of fibrous combustible matter and fusion of the plastics into dense particles for substantially complete separation and recovery of plastics from the lighter fibrous but non-fusible combustible matter through gas classification during the free fall. This same atmosphere also produces a clean, unoxidized, homogeneous, storageable and highly combustible fuel derived from the fibrous combustible matter.

18 Claims, 2 Drawing Figures

EQUIPMENT FOR TREATING AND RESOURCE RECOVERY FROM SOLID WASTE

CROSS REFERENCE TO RELATED APPLICATION

This is a divisional application of my pending application Ser. No. 827,693, filed Aug. 25, 1977, now U.S. Pat. No. 4,204,906. I hereby incorporate this application by reference.

BACKGROUND OF THE INVENTION

This invention relates to solid waste and more particularly, relates to equipment and method for treating solid waste for the purpose of producing commercially valuable by-products such as separated plastics and pulverized refuse derived fuel from solid waste.

Solid waste includes municipal wastes, industrial wastes, agricultural wastes and mixtures of these solid wastes. For the purpose of illustration, however, the invention is described mostly in connection with municipal solid waste.

Treating or disposing of solid waste is an extremely serious and ever worsening national and international problem. This is because: (1) solid waste is rapidly growing in volume and tonnage even on a per capita basis; (2) the rapidly rising cost of landfill and other ecological considerations; and (3) the skyrocketing cost of energy and other valuable materials which the solid waste contains. Table 1 clearly shows all these three trends for municipal solid waste.

TABLE 1

| | Trends in Muncipal Solid Waste | | | | |
|---|---|---|---|---|---|
| Year | 1920 | 1940 | 1960 | 1977 | 2000 |
| Waste production rate: per capita, lbs/day | 2.6 | 3.1 | 4.3 | 5.4 | 7.5 |
| Total potential recovery: Energy equivalent, million bbls of oil | 130 | 160 | 210 | 270 | 375 |
| Energy, billion dollars (1977 $15/bbl) | — | — | — | 4.1 | — |
| Steel, million tons | 8 | 9.5 | 12 | 17 | 22 |
| Steel, million dollars (1977 $50/ton) | — | — | — | 850 | — |
| Plastic/rubber, million tons | 5.5 | 7 | 8 | 11 | 16 |
| Plastic/rubber, billion dollars (1977 $200/ton) | — | — | — | 2.2 | — |

The very huge amount of solid wastes must be especially treated in an environmentally acceptable way, at any cost. When such treatment is properly done, not only can the harmful solid waste be converted into less harmful or neutral materials for easy disposal, but ideally the different components of the solid waste can be separated, and individually recovered for sale and recycling.

Table 1 shows the economic value of municipal solid waste. The resources of municipal solid waste are indeed very rich. In the average municipal solid waste, the following recoverable and resaleable components are present:

1. Metals, 8% by weight
2. Glass, 12% by weight
3. Plastics, 6% by weight
4. Fibrous combustible matter, 60% by weight Fibrous combustible matters are abundant in municipal solid waste. They are in the form of waste paper, newspaper, magazines, carton boxes, or other miscellaneous paper in thicknesses from 0.001" to $\frac{1}{4}$" or more.

The average heat content (or heat of combustion) of the fibrous combustible matters from municipal solid waste is about 5,000 Btu/lb. If completely recovered in the form of refuse derived fuel, the heat content gives the equivalent of 270 millions of barrels of oil in the year 1977 alone. At the oil price of $15 per barrel, this is equivalent to $4.1 billion.

Another source of fibrous combustible matters is the biomass, which is a combination of solid waste, agricultural waste, and plant life including trees, shrubs, grass cuttings, weeds or stalks of wheat, rice, and sugar cane. The total heat content in the biomass if all recovered could be as much as 30 times that in municipal solid waste, i.e., the equivalent of 8.1 billion barrels of oil, or over $120 billion in 1977 alone.

The cost of landfill now ranges from $3 to $18 per ton, but this cost is increasing by about 8% per year, the same rate as energy costs increase. In addition, the Resource Conservation Recovery Act of 1976 requires that all states in this country close all dumps by 1983; thus the cost of the remaining landfill space will probably rise still higher. Furthermore, the energy proposals by President Carter and the Congress contemplate higher costs for both domestic oil and newly discovered natural gas. It is, therefore, very important to transform solid waste into valuable, storageable fuel and other materials. This gives rise to the new "resource recovery" industry.

It is estimated that within 10 years, resource recovery will blossom into a billion dollar industry. About 30%, perhaps up to 50%, of the 147 million tons of municipal solid waste generated each year will be converted into fuel to supply up to 5% of the electricity needs for utilities and 18% of the gas needs in certain geographic areas.

Various technologies for recovering the resources from municipal solid waste have been developed and tried, with varying degrees of success. One technology involves "bulk burning" the solid waste in incinerators to produce steam for electricity, heat or cooling. This technology produces a non-storageable fuel, requires relatively high capital costs for the expensive combustion equipment, but relatively low operating costs. Another technology involves first shredding the solid waste and then mechanically separating the heavy metals and glass from the light paper and plastics. The separated metals and glass may be sold or landfilled. The paper (or other fibrous combustible matter) is treated chemically to weaken or break the fibrous bonds and then pulverized in air-filled hot ball mills with 450° F. steel balls to produce a refuse derived fuel. The plastic is mixed in the fuel and causes a serious pollution problem. This technology produces storageable "refuse derived fuel" and, compared to the first technology, has lower capital costs but higher operating costs because of the shredding operation. A third technology, called pyrolysis, involves burning the solid waste with very little oxygen to produce synthetic oil or gas, either for sale or for conversion into steam. This third technology has high capital and operating costs, partly because of the frequent jammings in the treating equipment, and is very experimental.

All these technologies suffer many disadvantages:
1. These technologies are unreliable and non-reproducible because each of them involves a number of processing steps which are not easily controlled or completely understood, but are very much dependent on the composition of the solid waste.

2. The treating equipments are bulky and heavy, costly to build, difficult to maintain, and irregular in operation.

3. The treating equipments are slow in operation. In the second technology, for example, the treating temperature is limited to about 450 F., above which paper and other fibrous combustible matter readily burn in air. This low treatment temperature requires long treatment time, i.e., over 40 minutes, to debond the fibrous matter.

4. They are high energy-consuming processes. Again, in the second technology, for example, hot ball mills are usually used to disintegrate the chemically treated fibrous matter to make the refuse derived fuel. The hot balls have to be raised against gravity from the bottom of the mills to near the top of the mills before such raised balls will drop down to strike other balls with the treated fibrous matter in between. The energy used to raise the balls is not only wasted, but harmfully wasted to produce harsh sounds on impact at more than 95 dBA.

5. Fusion of the plastics with other plastics, with other materials in the solid waste, or with the wall or components of the treating equipment often causes serious jamming problems, briefly mentioned previously, or even causes destruction of the equipment.

6. The non-separated, or incompletely separated, plastics, particularly PVC plastics, produce on burning not only dense smoke, but cancerous or poisonous fumes. This smoke and the fumes together with the noise and other pollution problems, often force the waste-treating industry to abandon the projects because of local opposition. Even finding a site can be difficult.

7. In treating wastes to obtain refuse derived fuel, an oxidizing or combustion supporting atmosphere is used inside the hot 450 F. treating equipment. This atmosphere, usually air, causes surface oxidation or combustion that produces a fire-retarding surface layer of ash. The unwanted oxidation and combustion further destroys the heat and economic values of the refuse derived fuel. Because of the non-separation or incomplete separation of plastics from the original fibrous combustible matter from which the recovered fuel is derived, the derived fuel is not homogenous but varies between and even within lots as to average size, size distribution, density, composition, combustibility, jamming characteristics and, above all, the heat value in the fuel, e.g., Btu/lb., which makes the derived fuel difficult to sell and use. As a matter of fact, such derived fuel has never been used alone in electricity generation facilities.

As a result of the above and other difficulties, none of the present three technologies have been profitable. All three still have unknown futures. Even their feasibility or operability and practical values have not been determined or estimated.

SUMMARY OF THE INVENTION

Therefore, to overcomethe foregoing problems and disadvantages, the general object of this invention is to provide commercially viable and high-speed, continuous process for treating municipal, industrial, agricultural, or other solid waste.

Another object of the invention is to provide an improved waste treating method with efficient and complete separation and recovery of paper and plastics in a rapid, continuous, freefalling and non-contacting manner to prevent fusion together of the plastics with other plastics, with the paper, or with the wall or components of the treating equipment.

A further object of the invention is to provide an improved waste treating method and improved equipment to prevent jamming and to guarantee uninterrupted and uniform feed and flow of solid waste.

A broad object of the invention is to reduce the noise and smoke pollution and to eliminate fire or explosion hazards so that the treating equipment or plant will be readily accepted by the local communities.

Another broad object of the invention is to produce nonjamming and storageable, highly combustible refuse derived fuels of uniform size, composition, density and heat value for ready transport to and easy acceptance by the user.

Still another broad object of the invention is to obtain refuse derived fuel having clean and readily combustible surfaces and undiminished heat content, with minimum surface oxidation or combustion during the treatment.

Yet another broad object of the invention is to simplify the solid waste treatment process to reduce the necessary treatment equipment down to even portable sizes for wide-spread use not only in waste treating centers, but in utilities, factories, office buildings, apartment complexes, condominium projects, trailer parks, individual family houses, forests, and farm fields.

Other objects and advantages of this invention will further become apparent hereinafter and in the drawing.

To these ends, the present invention provides a process for treating solid waste in which a non-oxidizing atmosphere is provided through which the shredded solid waste freely fall unsupported to prevent any fusion together of the plastics with other plastics, with other materials in the solid waste, or with the walls or components in the treating equipment. The unique atmosphere also allows a high treatment temperature to accelerate the treatment process and to allow the fusion and formation of spheres of individual flaky plastic particles into denser particles during their free fall which allows their ready and complete separation from the fibrous combustible matter. Meanwhile, the fibrous combustible matter is rapidly debonded while maintaining an undiminished heat content as well as clean, unoxidized and highly combustible surface. This invented waste treating process thus produces a refuse derived fuel which is homogenous, and reproducible in average size, size distribution, composition, density, combustibility, and heat value, with, therefore, the maximum economical value and acceptability by the user.

BRIEF DESCRIPTION OF THE DRAWING

The invention and its further objects and features will be more clearly understood from the following detailed description taken in conjunction with the drawing in which.

DETAILED DESCRIPTIONS

Figure 1:
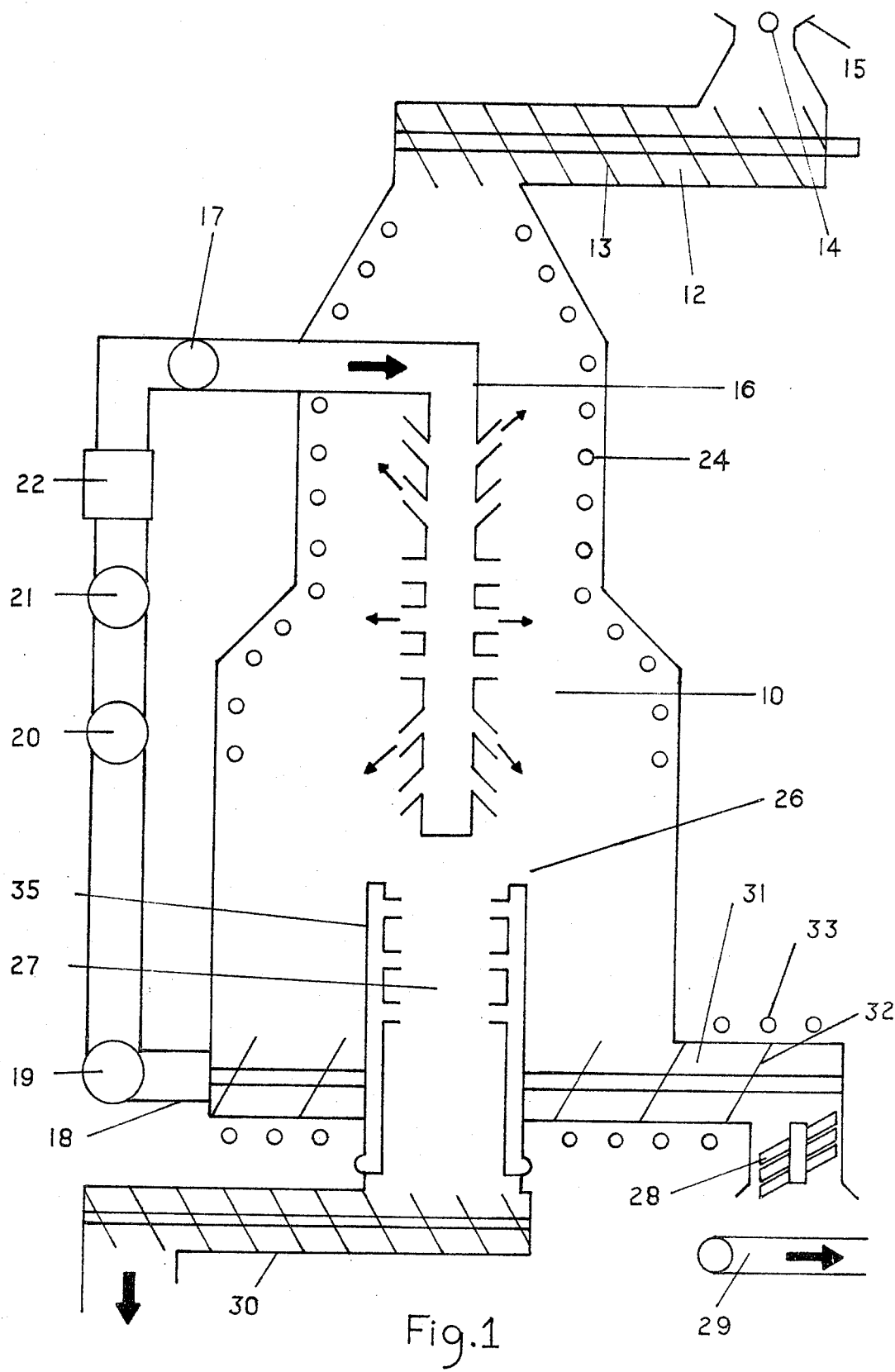
FIG. 1 is a vertical cross-section of the invented waste treating equipment.

In describing the preferred embodiments of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

With respect to the specific embodiments of the invention selected for illustration in the drawing, 10 designates generally a gas-tight, insulated cylindrical waste treating equipment. On top of the cylindrical treating equipment 10, there is a screw, air lock (or piston) feeding device 12 consisting, for example, of a multitude of rotating screw propellers 13. Shredded incoming solid waste 14 is dumped onto the hopper 15 having a reverse-tapered bottom to prevent jamming; and is then fed by the screw propellers 13 into the cylindrical treating equipment 10. Suitable heating means may be provided to preheat the incoming solid waste in the feeding device 12 to just below the fusion temperatures of the plastics (or similar matter) contained in the solid waste. The preheating minimizes the required dwell time of the solid waste inside the treating equipment 10. It is also preferable, though not absolutely necessary, to dry (by vacuum and/or heat) the incoming solid waste by vacuuming the moisture off through gas-permeable walls on at least a portion of the wall of the feeding device 12. Drying achieves: uniform feed into the treating equipment; minimum dwell time in the treating equipment; less bridging inside the equipment 10; and no acid formed in the equipment to corrode the equipment walls. It is also desirable to have gas-tight fittings between the tips of the screw blades 13 and the walls of the feeding device 12 so that the feeding device may be under a vacuum while the treating equipment may be at atmospheric or even higher pressures.

The cylindrical treating equipment 10 contains a non-oxidizing and non-combustible atmosphere such as nitrogen, argon, other inert gas, or mixtures of the above gases; together with a gaseous chemical substance, such as Cl, $SO_2$, $SO_3$, or $NO_2$, to break or weaken the bonds in the fibrous combustible waste matter. The proportion of the inert gas to Cl may vary from 70:30 down to 95:5 in volume. The mixed gases from the storage tank 22 are fed into the treating equipment 10 through the valve 17 and feed pipe 16, which have a number of radial openings, jets, pointing either upwardly (upper portion of pipe 16), or horizontally (middle portion), or downwardly (lower portion). The upwardly or downwardly pointing gas jets are to retard or accelerate the free fall of the shredded light fraction of solid waste which has been preseparated and contains enzymes (consisting mainly of fibrous combustible matter and plastic) inside the treating equipment 10. The mixed gases exit the treating equipment through the exit pipe 18 to enter a gas-treating or purifying device 20 and then a gas pump 21 before closing the circuit with the storage tank 22. The inside of the treating equipment 10 is heated by heaters 24 to a temperature so high that the fibrous combustible matter will burn in air or oxygen but not in the inert gases. A preferable temperature range is between 600° to 900 ° F. The higher this temperature, the faster is the chemical debonding process and also the faster the plastics fuse together to form balls. This temperature should be adjusted so that during the free fall of the mixed plastics and combustible fibrous matter from the top of the treating equipment 10, the plastics are sufficiently fused and balled and densified (from 10 lbs/cf to at least 30 lbs/cf). The number, location, size, shape, velocity, temperature and orientation of the mixed gas jets can also be varied advantageously to adjust the dwell times of solid waste and to achieve the same results. Note that since the plastics are freely falling in unsupported or contacted manner, they will not fuse together with each other, or with the combustible fibrous matter, or with the walls of components of the treating equipment 10. Jamming of the treating equipment 10 is thus minimized. In addition, this makes the refuse derived fuel produced in this equipment more homogenous in composition. Furthermore, the separation of the heavier, fused plastics from the lighter fibrous matter by the same radial mixed gas jets is also made more complete. Accordingly, the fibrous combustible matter is blown into the peripheral regions 26 to be additionally debonded in a screw conveyor 31 having screw blades 32 and heated by heaters 33 to temperatures equal to even higher than, that in the treating equipment 10. The debonded fibrous matter is then pulverized to less than ¼ inch by the rapidly rotating (over 500 rpm) pulverizing blades 28, before their fall onto the refuse derived fuel discharge conveyor 29. The heavier and denser plastic balls, on the other hand, are less affected by the radial mixed gas jets and, therefore, fall freely into the central region 27 and, after being cooled to prevent sticking together by the quenching gas jets 35 onto the plastic discharge conveyor 30. To minimize gas leakage and loss, air lock and gas seals are provided between the discharge conveyors 29 and 30 and the treating equipment 10.

To avoid chilling the falling shredded solid waste, the mixed gases should preferably be also heated to a temperature, from 600 F. to 900 F. If heated to the higher temperatures, even the heater 24 can be dispensed with.

Figure 2:
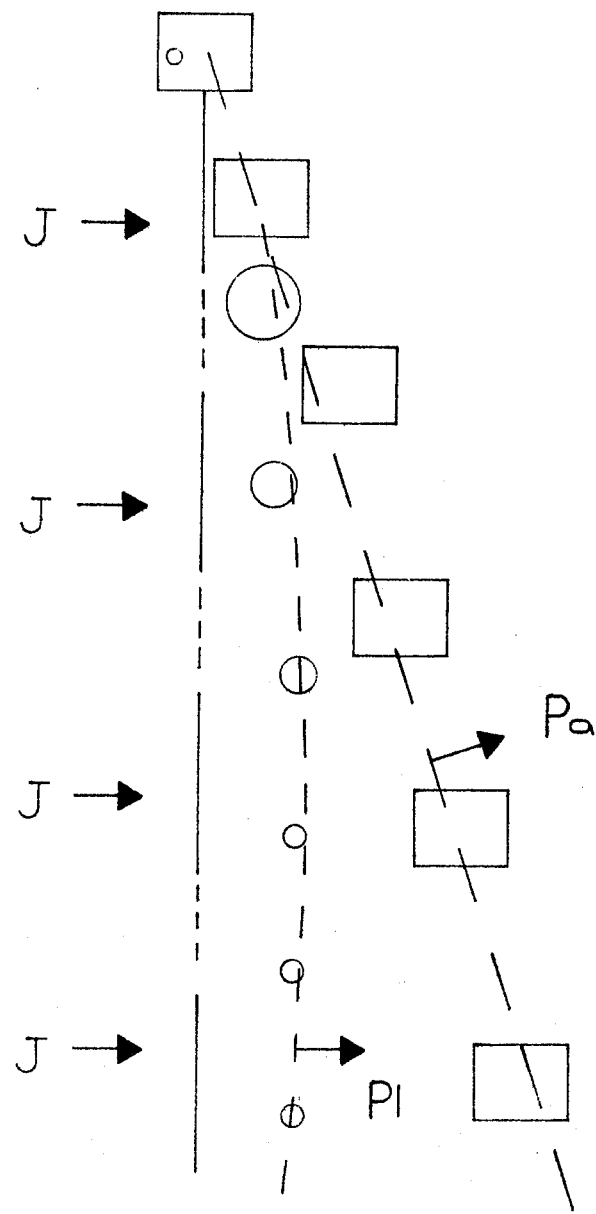
FIG. 2 shows the comparative size and "free fall" path of paper and plastic particles relative to the gas jets.

Tests with shredded 3"×3" plastics and paper sheets less than 20 mils thick show that they fall 15 feet in still air at room temperatures in about 10 seconds. At high temperatures, however, the plastics fuse and change shape and the paths of falls are different from those of the paper sheets. As shown in FIG. 2, starting at point 0 at the top, fibrous combustible matter, e.g., paper, whether as received integrally or debonded, maintain their shape and size during their floating, free falls and are easily deflected by the generally horizontal mixed jets (J) into the peripheral regions 26, according a typical path labeled (Pa). On the other hand, starting at the same position 0, the plastics at above 600° F. curl and fuse in 2 to 4 seconds. The curled and fused plastics sheets then fall rapidly and vertically into the central region 27 according to the path labeled (P1).

Advantages of the new process include:

1. Because of the use of non-oxidizing gases in the treating equipment 10, a much higher treatment temperature (i.e., 600–900 F. vs 450 F.) can be used resulting in much faster debonding and plastics fusion. The process is thus a high speed, continuous one.

2. The free fall of the shredded solid waste, unsupported and non-contacted, prevents any fusion together of the plastics with each other, or with other matters. Clean and complete separation of the plastics from the other components of the solid waste is thus possible. Clean refuse derived plastics command high prices.

3. The clean separation of plastics, together with the non-oxidizing atmosphere in the treating equipments allows the production of a high-quality, refuse derived fuel that is homogenous in size, size distribution, composition, density, is clean, storageable, transportable, combustible, and has a heat value (5000–6000 Btu/lb vs 4000–5500 Btu/lb for conventional refuse derived fuel).

4. There is no pollution due to noise, smoke, fumes from burning plastics.

5. The treating equipment is small and simple, low in capital and maintenance costs, and occupies much less floor space than conventional equipments.

6. The process consumes only a small amount of energy, which can be self-supplied.

7. Thereare no fire or explosion hazards because of the non-oxidizing atmosphere in the treating equipment.

The invention is not to be construed as limited to the particular forms disclosed herein, since these are to be regarded as illustrative than restrictive. A part of the treating equipment 10 can be used to practice the invention. For example, the upper part of the equipment can be used to separate plastics and fibrous combustible material only. The equipment 10, with its non-oxidizing mixed gases, at high temperature (over 600° F.) may be used only to heat biomass (without plastics) to produce refuse derived fuels.

Skilled persons in the art also will have occasion to practise numerous variations on specific features of the invention. It is my desire that all such variations fall within the spirit and scope of the invention as defined by the following claims:

I claim:

1. An equipment for treating a solid waste containing fibrous combustible matters and fusible plastics comprising:

means for heating said equipment to provide therein a vertically elongated, heating zone;

means for feeding said solid waste to a top portion of said heating zone and dropping said solid waste into said heating zone, said solid waste falling freely under gravity inside said zone;

during the free gravitational fall through said heating zone said solid waste being heated to a treatment temperature sufficiently high to fuse said fusible plastics and also to exceed the combustion temperature of said fibrous combustion matters in air;

means for establishing in said heating zone a gaseous atmosphere which will not support combustion of said fibrous combustible matters at said treatment temperature; and means for providing a separating force having at least a horizontal component to separate said falling and fusing plastics from said falling fibrous combustible matters.

2. The equipment as in claim 1 wherein said heating means comprising means for heating up at least a major portion of said solid waste to at least 700° F.

3. The equipment as in claim 1 wherein said heating means comprises hot gaseous jets flowing in generally radially outward directions.

4. The equipment as in claim 3 wherein said separating force is also provided by said radially outward directed gaseous jets.

5. The equipment as in claim 1 wherein said separating force, providing means comprises means for establishing a gas flow that has at least a horizontal component.

6. The equipment as in claim 5 wherein said gas flow establishing means comprises hot gas jets.

7. The equipment as in claim 6 wherein said hot gas jets are tilted vertically upward to retard the fall of said solid waste and to increase its dwell time inside said heating zone.

8. The equipment as in claim 1 including means for breaking at least part of the fibrous bonds in said fibrous combustible matters.

9. The equipment as in claim 8 wherein said breaking means comprises means for supplying a gaseous medium which reacts chemically with the fibrous bonds.

10. The equipment as in claim 1 including means for adding a reactive gaseous medium to said elongated, heating zone to affect at least part of the fibrous bonds in said fibrous combustible matters.

11. The equipment as in claim 10 including means for embrittling said fibrous combustible matters while maintaining undiminished heat value contained therein and also including means for pulverizing the embrittled fibrous combustible matters to less than ¼ inch in size.

12. The equipment as in claim 10 wherein said adding means comprises means for adding reactive gaseous medium selected from the group consisting of HCl, $SO_2$, $SO_3$, and $NO_2$.

13. The equipment as in claim 1 wherein said establishing means comprises means for supplying into said heating zone said gaseous atmosphere at a temperature in excess of 600° F.

14. The equipment as in claim 1 wherein said heating means comprises means for heating said gaseous atmosphere to a temperature in excess of 600° F.

15. The equipment as in claim 1 wherein said establishing means comprises means for supply into said heating zone a gas selected from the group consisting of nitrogen, argon, helium, and a mixture of these gases.

16. The equipment as in claim 1 wherein said heating zone is in the form of a vertically oriented, cylindrical heating zone.

17. The equipment as in claim 16 including means for collecting said fused plastics and fibrous combustible matters at two separate regions at the lower end of said cylindrical heating zone.

18. The equipment as in claim 17 wherein said two separte collecting regions are in the form of concentric regions, the fused plastics being collected at the inner region while the fibrous combustible matters being collected at the outer, concentric region.

* * * * *